(12) United States Patent
Kaajakari

(10) Patent No.: US 8,076,825 B1
(45) Date of Patent: Dec. 13, 2011

(54) ELECTRET FILM GENERATOR

(75) Inventor: Ville Kaajakari, Ruston, LA (US)

(73) Assignee: Louisiana Tech University Foundation, Inc., Ruston, LA (US)

( * ) Notice: Subject to any disclaimer, the term of this patent is extended or adjusted under 35 U.S.C. 154(b) by 699 days.

(21) Appl. No.: 12/172,456

(22) Filed: Jul. 14, 2008

Related U.S. Application Data

(60) Provisional application No. 60/949,411, filed on Jul. 12, 2007.

(51) Int. Cl.
*F02B 63/04* (2006.01)
*H01L 41/00* (2006.01)

(52) U.S. Cl. .................. 310/339; 310/317; 290/1 R

(58) Field of Classification Search .......... 290/1 R; 310/339, 319, 309, 317; 36/137; 362/103
See application file for complete search history.

(56) References Cited

U.S. PATENT DOCUMENTS

| | | | | |
|---|---|---|---|---|
| 4,654,546 A * | 3/1987 | Kirjavainen | ............. | 307/400 |
| 5,500,635 A * | 3/1996 | Mott | ............. | 340/323 R |
| 5,903,103 A * | 5/1999 | Garner | ............. | 315/76 |
| 6,104,140 A * | 8/2000 | Wut et al. | ............. | 315/200 A |
| 6,320,297 B1 * | 11/2001 | Gurich et al. | ............. | 310/316.03 |
| 6,433,465 B1 * | 8/2002 | McKnight et al. | ............. | 310/339 |
| 6,661,155 B2 * | 12/2003 | Schrod | ............. | 310/316.01 |
| 6,768,246 B2 | 7/2004 | Pelrine et al. | | |
| 6,852,402 B2 | 2/2005 | Kirjavainen et al. | | |
| 6,982,497 B2 | 1/2006 | Rome | | |
| 6,989,999 B2 * | 1/2006 | Muramatsu et al. | ............. | 363/60 |
| 7,034,432 B1 | 4/2006 | Pelrine et al. | | |
| 7,162,392 B2 | 1/2007 | Vock et al. | | |
| 7,376,239 B2 | 5/2008 | Kirjavainen | | |
| 7,812,503 B2 * | 10/2010 | Kakehi et al. | ............. | 310/317 |
| 2004/0183306 A1 | 9/2004 | Rome | | |
| 2005/0275310 A1 * | 12/2005 | Ripoll | ............. | 310/317 |
| 2006/0238066 A1 | 10/2006 | Pelrine et al. | | |
| 2010/0141089 A1 * | 6/2010 | Schestag et al. | ............. | 310/317 |
| 2010/0194236 A1 * | 8/2010 | Verkoglyad et al. | ............. | 310/308 |
| 2011/0037349 A1 * | 2/2011 | Sham et al. | ............. | 310/339 |

OTHER PUBLICATIONS

"Application Note 725 DC/DC Conversion without Inductors"; Internet publication from www.maxin-ic.com/an725; Nov. 29, 2001.

* cited by examiner

*Primary Examiner* — Julio Gonzalez
(74) *Attorney, Agent, or Firm* — Jones, Walker, Waechter, Poitevent, Carrere & Denegre, LLP

(57) ABSTRACT

A DC generation and storage device including a power generation section with multiple layers of an electret film. A rectifier is connected to the electret film, which in turn will be connected to a DC to DC converter. A power storage device (e.g., a battery or capacitor) will be connected to the converter.

20 Claims, 8 Drawing Sheets

Schematic representation:

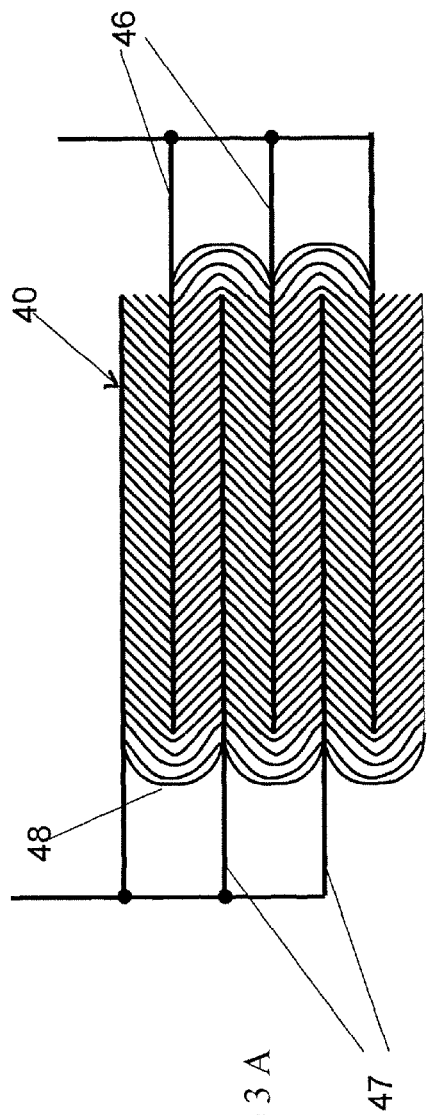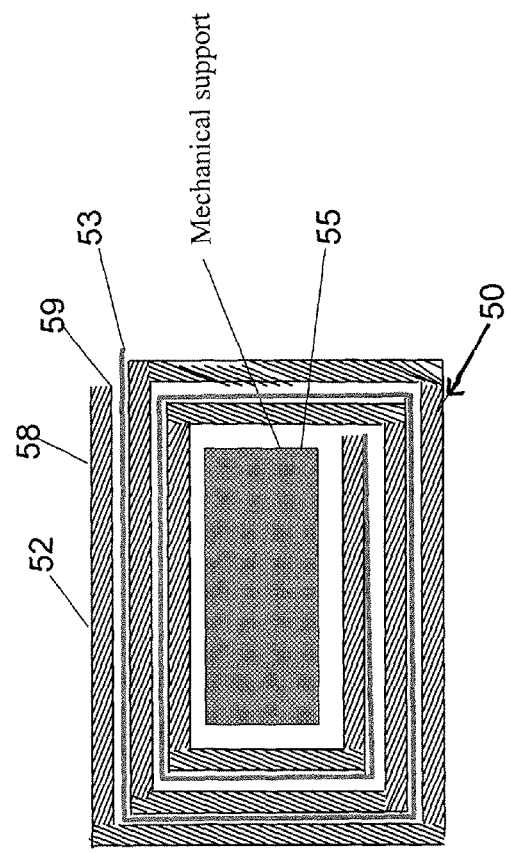
Figure 3 A
Figure 3 B

ELECTRET FILM GENERATOR

CROSS-REFERENCE TO RELATED APPLICATION

This application claims the benefit under 35 USC §119(e) of U.S. Provisional Application Ser. No. 60/949,411, filed Jul. 12, 2007 which is incorporated by reference herein in its entirety.

STATEMENT REGARDING FEDERALLY SPONSORED RESEARCH OR DEVELOPMENT

The invention described herein was made with support of the U.S. Government, and the U.S. Government may have certain rights in the invention as provided for by the terms of Grant No. W31PQ-07-1-003 awarded by the Defense Advanced Research Projects Agency.

FIELD OF INVENTION

This invention relates to materials which generate electricity when deformed and a converter circuit useful for the same. In certain embodiments, the invention relates to devices worn on the person which generate electricity from movement of the person.

BACKGROUND OF INVENTION

It is known in the art to use flexible materials to generate electricity from routine motions of individuals (e.g., walking). For example, U.S. Pat. No. 6,433,465 uses the electrical response phenomenon of electrostrictive polymers in reverse to harvest or generate electrical power from human walking motion. In this prior patent, a polymer material is incorporated into the soles of footwear and is either full- or partial-wave rectified and then if desired, converted to a direct current (DC) voltage level suitable for battery charging and the like.

Nevertheless, when dealing with such comparatively low-level power systems, any improvements in efficiency can offer significant advantages and offer a much more practical energy recovery system.

SUMMARY OF SELECTED EMBODIMENTS OF INVENTION

One embodiment of the invention comprises a DC to DC converter circuit. The circuit will include a voltage input terminal and a voltage output terminal together with a first capacitor element and a second capacitor element, where the second capacitor element comprises a plurality of individual capacitors. The circuit will further include a switch network which has: (1) a first phase wherein the plurality of capacitors are in series and connected to the first capacitor element and disconnected from the output terminal; and (2) a second phase wherein the plurality of capacitors are in parallel and connected to the output terminal and disconnected from the first capacitor element. Finally, there is a switch controller that controls the switching between the phases. The switch controller monitors the voltage on the first terminal. The switching is initiated only if the voltage in the first terminal is sufficiently high.

Another embodiment of the invention will be a DC generation and storage device. The device will include a power generation section comprising multiple layers of an electret film. A rectifier is connected to the electret film, which in turn will be connected to a DC to DC converter, for example the converter as described immediately above. Finally, a power storage device (e.g., a battery or capacitor) will be connected to the converter.

BRIEF DESCRIPTION OF THE DRAWINGS

FIG. 3A illustrates one example of the power generation section for the shoe.

FIG. 3B illustrates another example of how the power generation section for the shoe may be formed.

DETAILED DESCRIPTION OF INVENTION

As used in this specification, the following terms will be defined as follows:

"Shoe" means any form of foot wear, including but not limited to military boots, hiking boots, tennis shoes, ski boots, running shoes, snow shoes, sandles, etc.

"Electret Film" means a polymer film which has been permanently charged, for example by radiation or corona discharge. In certain embodiments, the film has cavities, cells or voids and the cell walls have been charged after formation of the cavities. In one embodiment, the polymer film is polypropylene, but a great number of different polymers may be used, including nonlimiting examples such as polyethylene, polytetrafluoroethylene, PVDF, polymethylpentene and cyclic olefin copolymer. In another embodiment, the film is a foam layer having positive and negative charges on opposite internal void surfaces and at least one conductive coating on an outer surface of the layer. Some films may have conductive layers on both outer surfaces while other films may have no conductive layer. In certain embodiments, the cavity, cell, or void sizes will range between about 1 um and 1 mm or any range therebetween. Nonlimiting examples of film thickness may be about 25 um to about 1 mm (or any range therebetween). Nonlimiting examples of such electret films are found in U.S. Pat. Nos. 4,654,546, 6,852,402, and 7,376,239, each of which is incorporated by reference herein in their entirety.

"Power storage device" means any existing or future developed device capable of storing (either temporarily or for longer periods of time) electrical energy, nonlimiting examples including batteries, capacitors or supercapacitors.

Figure 1:
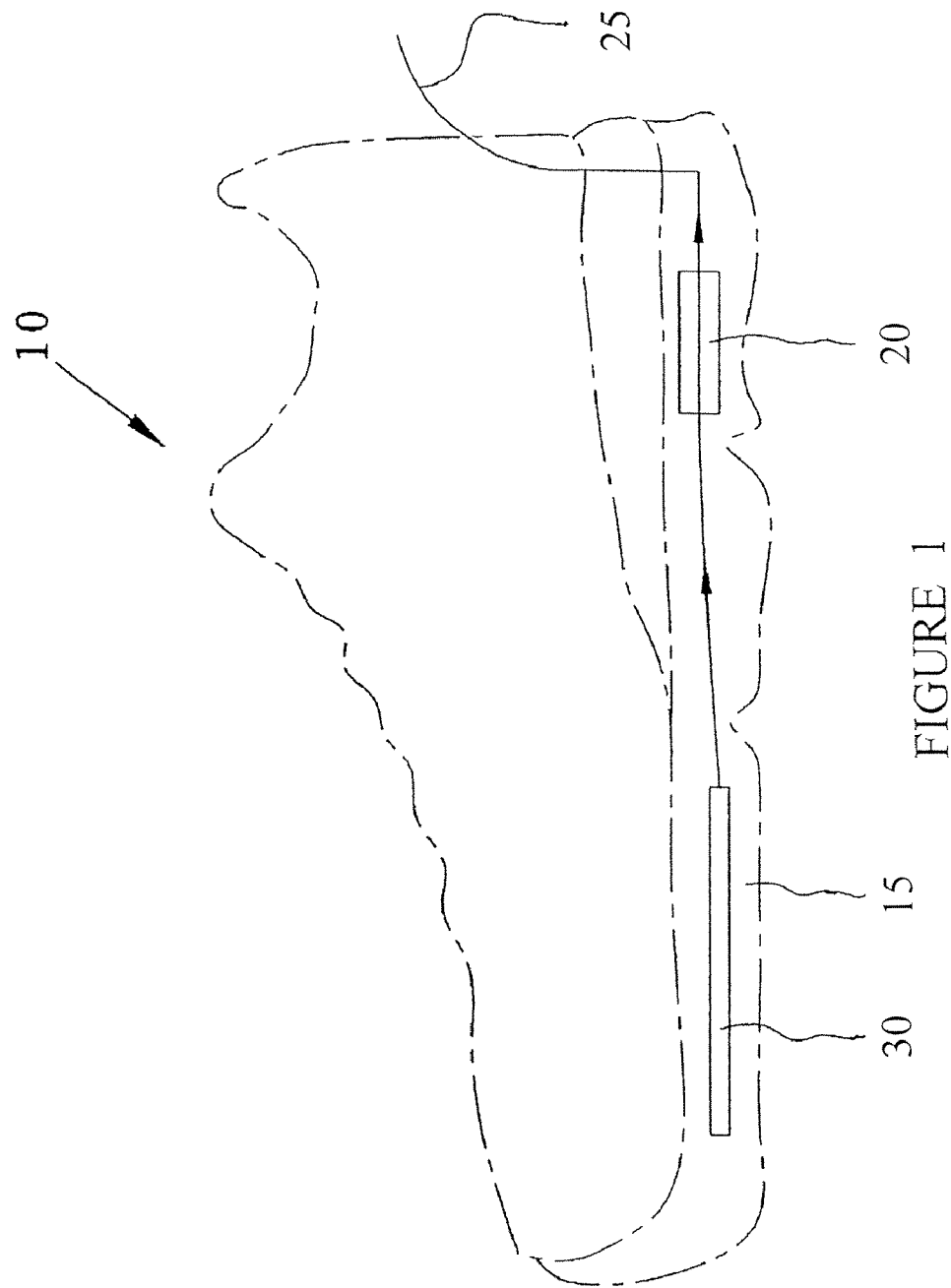
FIG. 1 illustrates one embodiment of the present invention, a power generating shoe.

FIG. 1 illustrates one embodiment of the present invention, a power generating shoe 10. Shoe 10 includes a sole 15 with toe cavity 30 and heel cavity 20 formed in sole 15. Toe cavity 30 and heel cavity 20 will be sized to receive a power generation section formed of an electret material as described below. Although FIG. 1 illustrates both toe and heel cavities, other embodiments could have only one of the toe or heel cavity. Likewise, other alternatives could position the electret material in other places in the sole or simply all long the entire sole. The electret material could be in a cavity in the shoe, formed integrally as part of the shoe, or a separate attachment positioned on the show.

Figure 2:
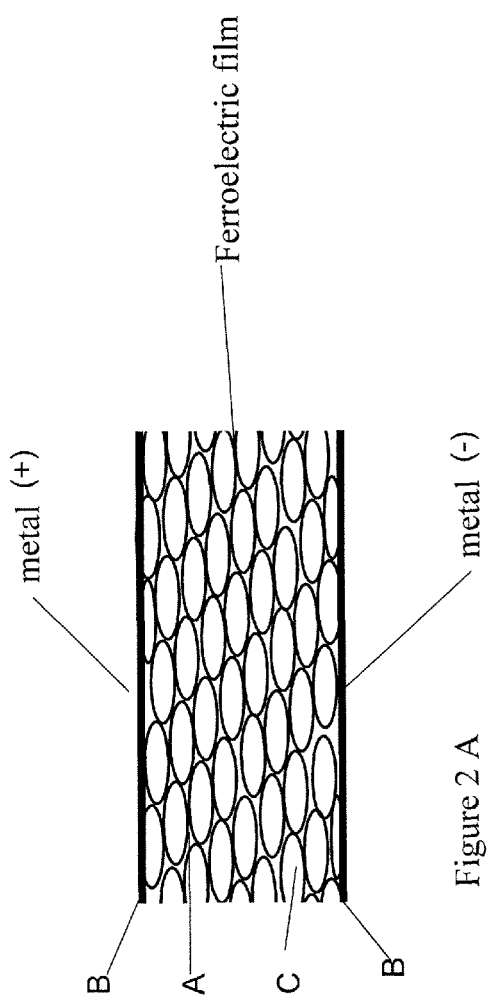
FIG. 2A illustrates one example of an electret film.
FIG. 2B is a schematic representation of the electret film.
Figure 2:
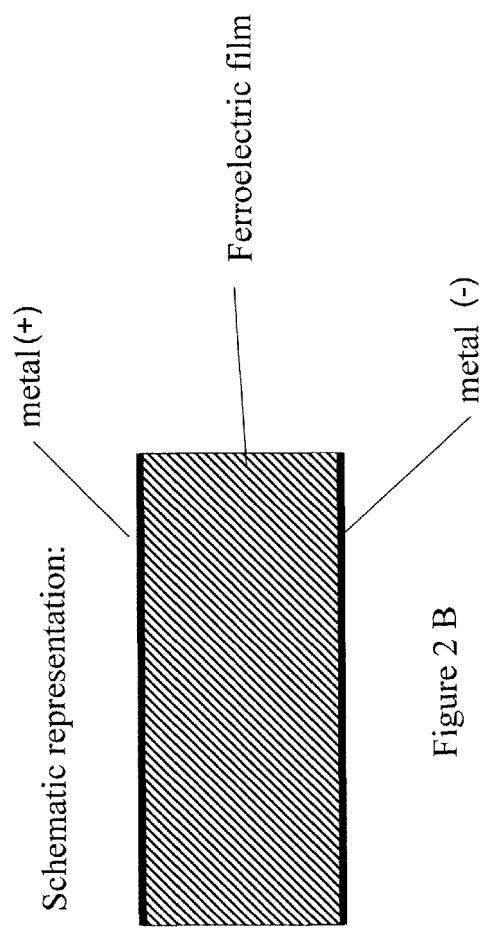

FIG. 2A illustrates one example of an electret film as disclosed in U.S. Pat. No. 4,654,546. The electret film includes a plastic matrix A having voids or blisters C and metal films B on an upper and lower surface of the plastic matrix. FIG. 2B is a schematic representation of the electret film.

FIG. 3A illustrates one example of how the power generation section for the shoe may be formed. FIG. 3A is a folded stack 40 of electret film (similar to FIG. 2a in U.S. Pat. No. 4,654,546). The folds at bends 48 result in the same polarity metal surfaces being in contact with one another. Electrical leads 46 and 47 extend within the folds of the film such that electrical leads 46 contact only one side (i.e., one metal surface layer) of the film and electrical leads 47 only contact the opposite side (polarity) of the film.

FIG. 3B illustrates another example of how the power generation section for the shoe may be formed. FIG. 3B is a roll 50 of electret film. In the embodiment shown, the electret film is wound around a mechanical support 55. The purpose of the mechanical support is to enable rolling of the film and to keep the film stack in shape after rolling. The support should be of low weight material such as plastic or wood or another dielectric material. In addition, electrical contacts to the film can be made by way of the support. In one embodiment, the support is a circuit board with electrodes patterned for electrical contact to the film. An insulating film 53 will be positioned between the wound layers of the electret film in order that the opposing (polarity) metal surfaces 58 and 59 do not come into electrical contact. In one example, the film thickness is about 50 um and the total film stack thickness is about 1 cm. Thus, the total stack would consist of about 100 wraps. The energy output from the film is proportional to the total charge generated. This is proportional to the film area. A larger number of wraps and hence a larger total film area is more readily obtained with a thin film. More preferred embodiments maintain the film thickness above 10-20 um as thinner films are more difficult to handle and process. Although not explicitly shown, it will be understood that electrical leads would be attached to metal surfaces 58 and 59 and could connect with a circuit such as seen in FIG. 4A.

Figure 4:
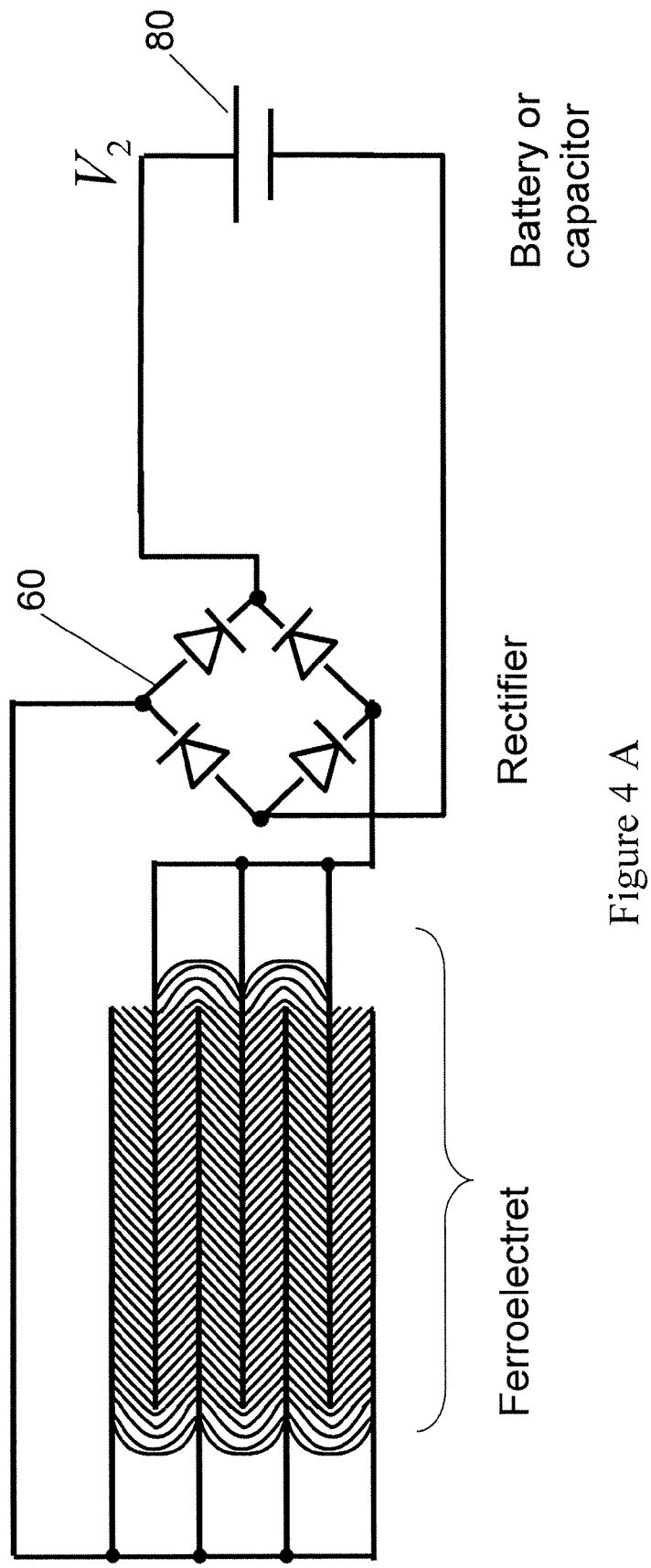
FIG. 4A demonstrates one circuit which may be used in conjunction with the power generating section.
FIG. 4B is similar to FIG. 4A, but further illustrates a conventional step-down DC to DC converter integrated with the circuit.
Figure 4:
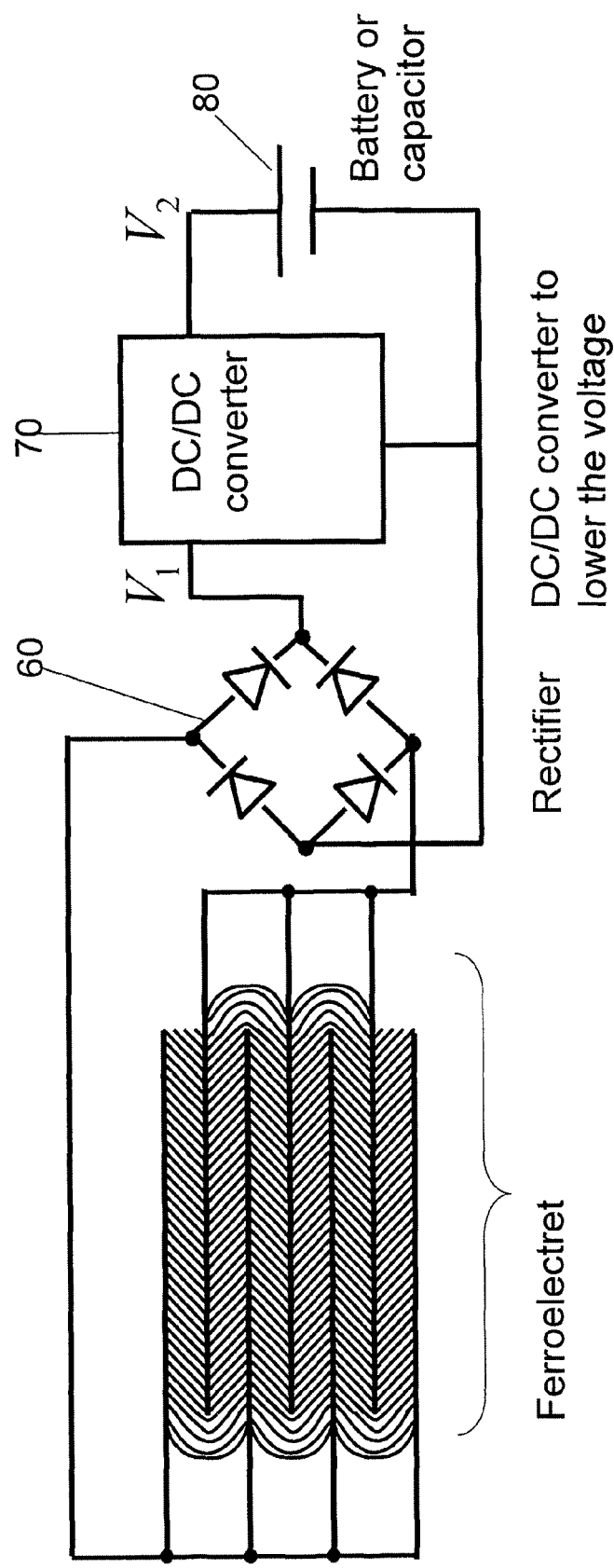

FIG. 4A demonstrates one very basic circuit which may be used in conjunction with the power generating section. In this circuit, a conventional rectifier 60 connects to the electrical leads of the folded or rolled electret film and ensures only a DC current of correct polarity is directed to battery 80. When force is applied to the film, it will generate charge Q. This charge is delivered to the battery with a voltage V and the total energy delivered to the battery is E=QV. As many applications may employ a battery with comparatively low voltage, typically 3V, and significantly higher charging voltages cannot be delivered to the battery without damaging it, the energy harvested with the direct connection to the battery voltage is low.

FIG. 4B is similar to FIG. 4A, but further illustrates a conventional step-down DC to DC converter 70 (e.g., a buck converter or switched capacitor circuit) positioned between rectifier 60 and battery 80. The step down converter allows higher voltages (e.g. about 50V to about 150V) at the rectifier output than is practical when connecting the rolled/folded electret film stack directly to a battery. Because piezoelectric transducers typically have high electrical impedances Z, the output power ($P \approx V^2/Z$) will be small unless comparatively higher voltages are used. For example, if the dc voltage is 90 V, the energy generated by the transducer is E=QV, is 30 higher than in FIG. 4A where the power generating section is connected to a 3 volt battery without being stepped down.

Figure 5:
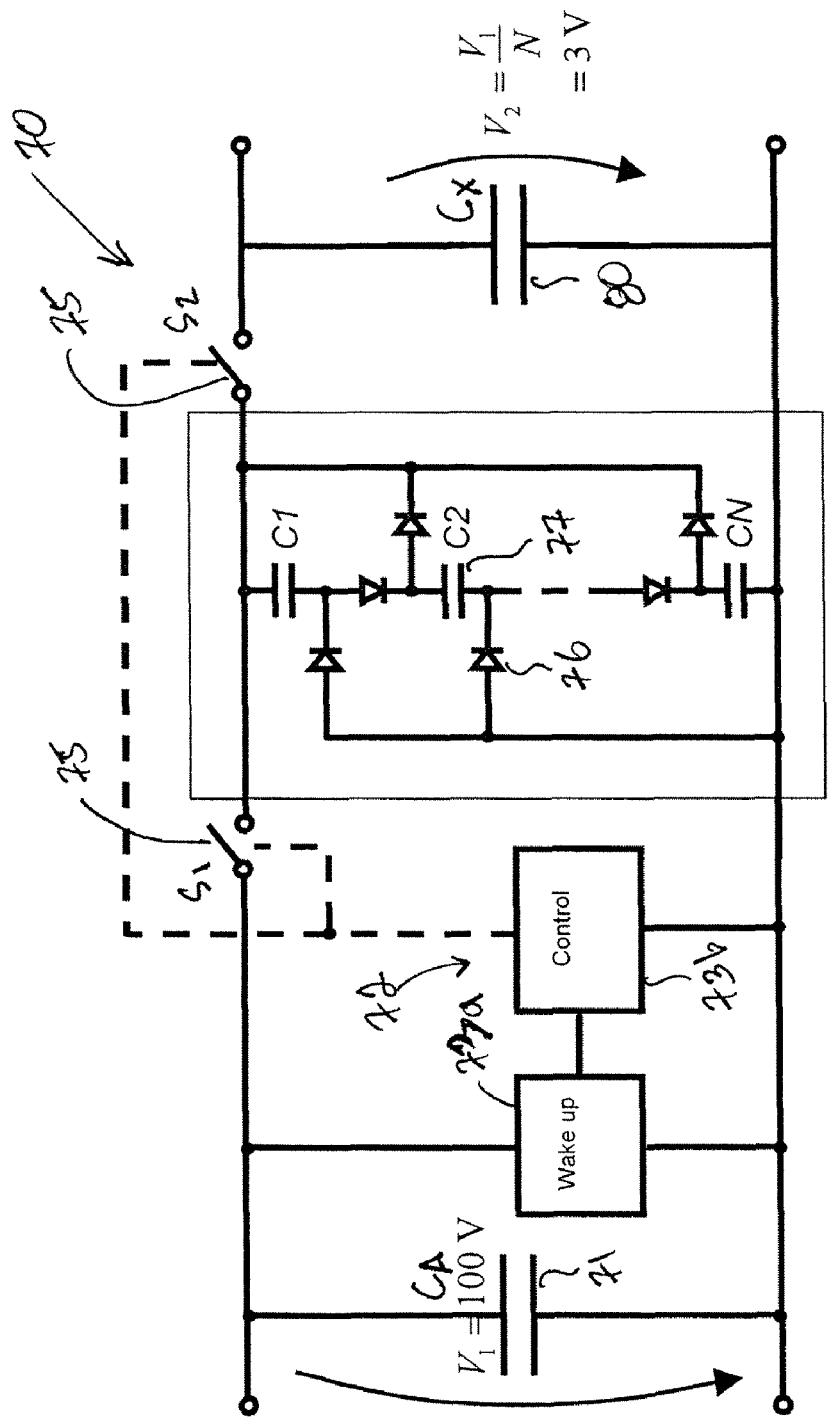
FIG. 5 illustrates one embodiment of a converter circuit which may be used in the present invention.
Figure 6:
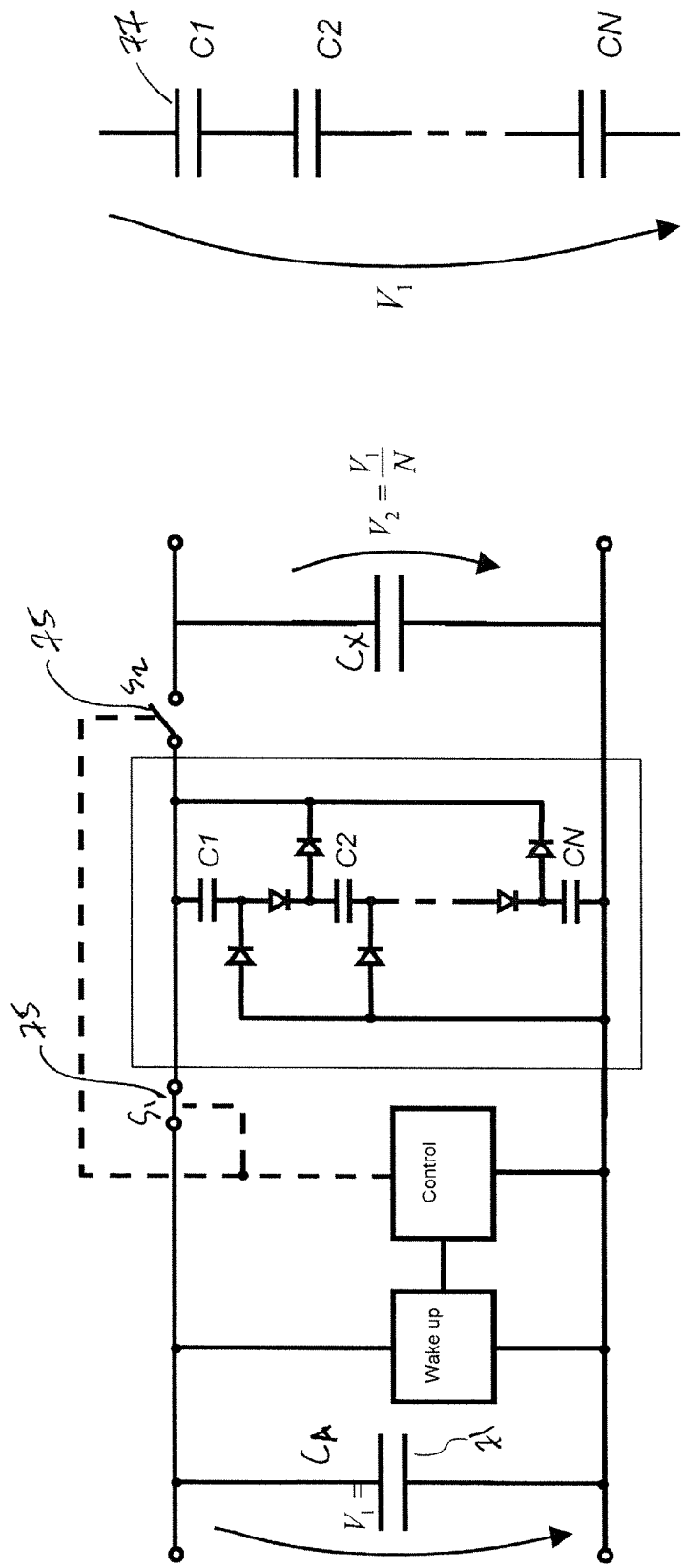
FIG. 6 illustrates the converter circuit of FIG. 5 switched to one phase or state.
Figure 7:
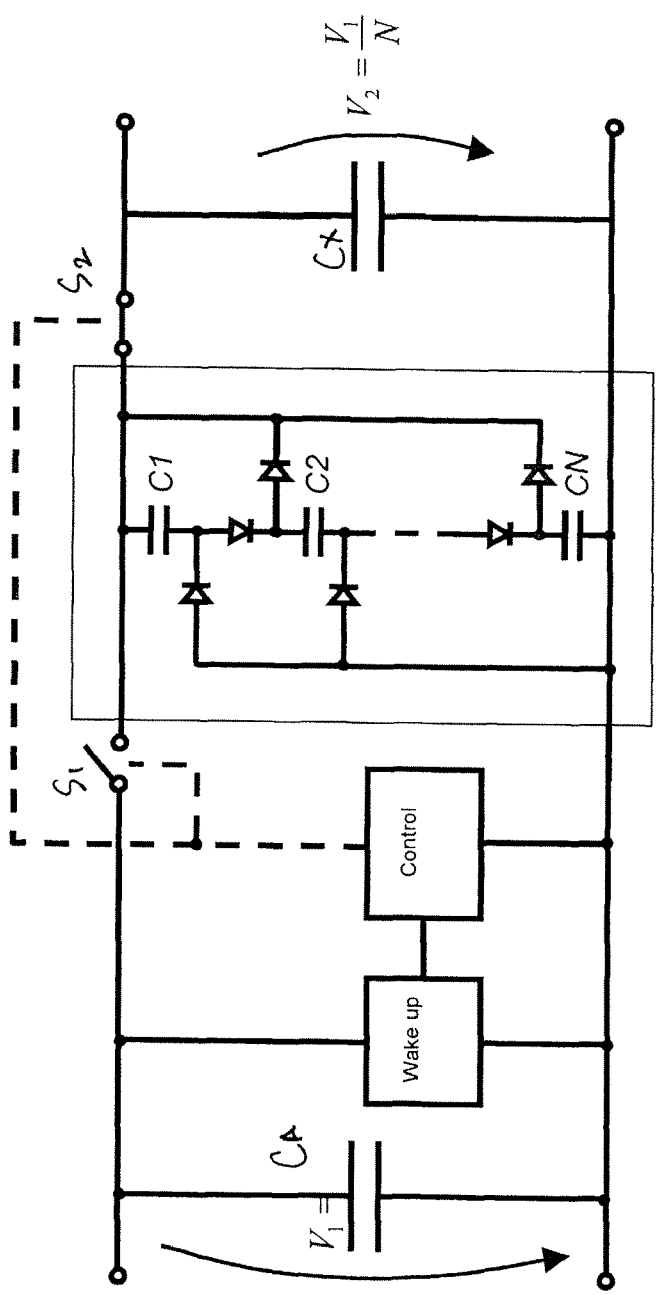
FIG. 7 illustrates the converter circuit of FIG. 5 switched to another phase or state.
Figure 7:
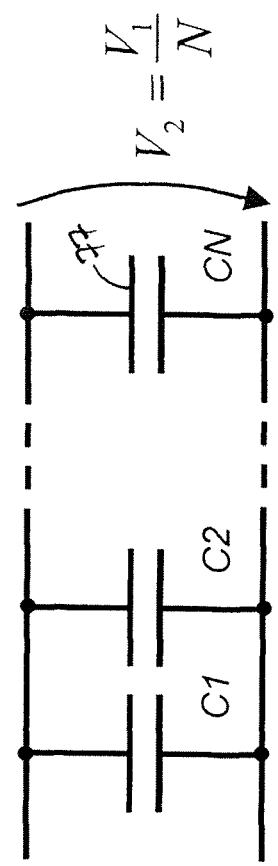

FIGS. 5 to 7 illustrate one embodiment of a converter circuit 70 which may be used in the present invention. FIG. 5 shows a circuit having a first capacitor element 71, which may be a single capacitor $C_A$ (as in the Figures), but also could be a group of capacitors (for example in series or a combination of series and parallel capacitors). The capacitor elements described herein may be conventional capacitors or other devices (conventional or future developed) capable of generating a capacitance. Circuit 70 also includes a second capacitor element 77, which in the particular example of FIG. 5 is a plurality of individual capacitors $C_1$ to $C_N$. A plurality of diodes 76 will be positioned between capacitors $C_1$ to $C_N$ in order to direct current flow during the alternative switching phases described below. The value of "N" (i.e., the number of capacitors) will determine the percentage step down accomplished by converter circuit 70 as is explained below. A battery element 80 or other storage device such as capacitor $C_X$ will be positioned parallel to second capacitor element 77.

A switch network 75 will include switches S1 and S2 positioned on each side of the second capacitor element 77. Switch network 75 will be controlled by a switch controller 72. In the embodiment of FIGS. 5-7, switch controller 72 will comprise a conventional wake-up circuit 73a and oscillator 73b for sequentially operating switches S1 and S2. In one embodiment, wake-up circuit 73a is positioned in parallel with capacitor $C_A$. In this embodiment, the wake-up circuit contains a solid-state voltage reference such as a zener diode. When the voltage reaches the internal reference voltage, the wake-up circuit gives an output signal for example by changing the voltage on the output pin. Wake-up circuit 73a will turn on oscillator 73b when the voltage across capacitor $C_A$ reaches a predetermined value and turn off oscillator 73b when the voltage across capacitor $C_A$ falls below a predetermined value. As explained below, the values at which oscillator 73b is turned on and off will be governed by desired input and output voltage for converter circuit 70. In one embodiment, oscillator 73b can be based on a simple relaxation oscillator that oscillates at about 500 Hz. Oscillator 73b should have two non-overlapping outputs to control the on/off positions of switches S1 and S2. In the example shown in FIGS. 5-7, the switches should never be both on at the same time. In another embodiment, an integrated version of the controller can be based on an oscillator and state machine that switches the signals. The circuit 70 could be formed in any conventional or future developed manner, including being formed from discrete circuit elements or being formed as an integrated circuit on a single chip.

The operation of converter circuit 70 may be illustrated with FIGS. 6 and 7. FIG. 6 shows a first phase or state where S1 is closed and S2 is open. In this switching configuration, the plurality of capacitors $C_1$ to $C_N$ are in series and connected to the first capacitor element 71 (capacitor $C_A$) and are disconnected from capacitor $C_X$ (e.g., the output terminal of converter circuit 70). Because capacitors $C_1$ to $C_N$ are in series and connected to the capacitor $C_A$, this results in the total voltage across capacitors $C_1$ to $C_N$ being equal to the voltage across capacitor $C_A$ (i.e., voltage V1) as suggested by the right-hand insert in FIG. 6. This also means that the voltage across each of the individual capacitors $C_1$ to $C_N$ is equal to V1/N.

However, the next cycle of oscillator 73b will cause circuit 70 to switch to the second phase or state shown in FIG. 7 where S1 is open and S2 is closed. In this switching configuration, the plurality of capacitors $C_1$ to $C_N$ are connected in parallel with capacitor $C_X$ and are disconnected from capacitor $C_A$ (e.g., the input terminal of converter circuit 70). Because capacitors $C_1$ to $C_N$ are parallel to one another and to the capacitor $C_X$, the voltage is equal across all these elements. Further, because the voltage across a capacitor cannot change instantaneously, the voltage across capacitor $C_N$ and $C_X$ (V2) is equal to V1/N as suggested by the bottom insert in FIG. 7. The voltage V1/N should be higher than the voltage over $V_X$ to enable charge transfer from capacitors $C_1$ to $C_N$ to $C_X$.

As mentioned above, one embodiment of oscillator 73*b* switches the circuit at about 500 Hz. In this embodiment, where the input voltage V1 is in the range of 100V to 120V and it is desired to have an output voltage V2 in the range of 3V to 5V (e.g., to charge a 3V battery), the capacitance (of each) of capacitors $C_1$ to $C_N$ is approximately 1 uF and the capacitance of $C_A$ is approximately 1-100 uF. To obtain an output voltage of 3V-5V from a input voltage of 120V, it will be apparent that N should be in the range of 20 to 40. Likewise in this embodiment, wake-up circuit 73*a* will turn on oscillator 73*b* when the input voltage V1 reaches the neighborhood of 120V and will turn off oscillator 73*b* when the input voltage drops to the neighborhood of 110V. Thus it can be seen that when oscillator 73*b* is on, converter circuit 70 switches between the charging phase of FIG. 6 (charging capacitors $C_1$ to $C_N$) and the discharging phase of FIG. 7 (discharging capacitors $C_1$ to $C_N$). Capacitor $C_A$ does not become fully discharged during operation of the circuit and output voltage V2 stays within the approximate range of 120/N and 110/N.

A unique property of the above described embodiment of converter circuit 70 is that its operation is based on the input voltage. A typical prior art dc/dc converter seeks to maintain constant output. The controller described in this embodiment only operates when there is sufficient input voltage to enable efficient conversion.

Naturally it will be understood that the above circuit parameters are simply for one embodiment of the invention and those parameters could vary greatly. The energy obtained from the electret film increases with the voltage. Thus, for high power output, the voltage is preferably high, for example in the range of about 100 to about 500 volts. On the other hand, the very high voltages (for example above about 1 kilovolt) may be impractical as it may result in breakdown in the electret film or in the conversion circuit. For example, the generator devices will typically be designed to generate a voltage in the range of about 3 V to about 500 V (or any range there between) with the lower range corresponding to the direct connection to a battery without conversion and the upper range being influenced by the availability and cost of electronic components that can withstand high voltage. If the voltage is too low, very little practical power is generated. If the voltage is too high, lower cost circuit components needed to handle the higher voltage may become too large for a system that unobtrusively fits within a shoe or other personal equipment. However, circuit components handling higher voltages and being sufficiently small can be incorporated into the design if the higher costs are justified or if technological improvements lower the cost of high voltage components. For the about 3 to 500 voltage ranges described above, the approximate capacitance range of capacitors $C_1$ to $C_N$ could be between about 0.1 uF and about 100 uF and the capacitance for $C_A$ could be between about 1 uF and about 1 mF. Typically, as the capacitance $C_1$ to $C_N$ becomes smaller, the clock (oscillator) speeds must increase.

Likewise, while the embodiment of FIGS. 5-7 utilize the arrangement of diodes and the two switches S1 and S2 to create the two phases where the capacitors $C_1$ to $C_N$ alternate between a parallel configuration and a series configuration, those skilled in the art will recognize many different ways to accomplish these two phases. For example, it could be accomplished (although less efficiently) with a larger number of switches and a more complex control network operating the switches.

Furthermore, converter circuit 70 is not limited to the voltage ranges generated by human powered devices, but could be employed to handle voltage ranges much higher. The voltage source could be from any repetitive mechanical motion acting on a power generating film or could be any other voltage source. The above described converter circuit may be very useful for other applications where electrical power is generated with an electret or piezoelectric power generator that can output high voltages. One advantageous aspect of this embodiment of the converter is that it operates only when the input voltage has reached sufficiently high level and is based on switching between series and parallel combinations of the capacitors. However, it will be understood that not all embodiment necessarily incorporate this aspect.

Returning to FIG. 1, it will be understood that folded stack 40, a roll 50 (FIGS. 3A and 3B), or some other configuration of multiple layers of the electret film may be position in heel cavity 20 and/or toe cavity 30. As used herein, a "heel" or "toe" cavity simply means a cavity in the vicinity of the heel or toe such that weight from the heels or balls of the feet compresses the film layers while the user is walking or running. The electrical leads from the electret film will be connected to wire 25 which in turn connects to other circuit elements such as rectifier 60, converter 70 and battery 80. Rectifier 60, converter 70 and battery 80 may be positioned within the shoe sole, on the outside of the shoe, or separate from the shoe (such as on the body or clothes of the wearer of the shoe). In one embodiment, rectifier 60, converter 70, and battery 80 may be formed on an integrated circuit which is positioned on the shoe or within the shoe's sole. As the wearer of the shoe walks or runs, the electret material is alternately placed in compression and released, thereby generating a AC voltage which may be rectified, stepped down, and the power stored in the battery. In certain applications it is possible to replace the battery or charge storage capacitor with a device that will use the generated power immediately. For example, it is possible to connect the converter output directly to light emitting diode. This way the shoe will have a blinking light which illuminates whenever the user steps on it. However, the invention is in no way limited to a particular type of electronic component which can be attached to the converter output.

Further, although the figures illustrate the layers of electret material positioned in a shoe, the present invention includes using the electret film as a power generation device in any number of environments. For example, the electret film could be position between a backpack and the body of wearer or between two mechanical objects. The only requirement is that the electret film be in a position such that it will be alternatively compressed and released. Although the above embodiments describe employing an electret material, other embodiments could employ any electro-mechanical transducer material (i.e., any material producing an electrical charge when subject to mechanical force, including electret or piezoelectric materials). Furthermore, when the term "connected" is used herein, it not only means two elements directly connected, but can also mean two elements indirectly connected with one or more further elements in between.

Other embodiments may include (Embodiment A) a power generating shoe comprising: a. a shoe body having a heel cavity and a power generation section positioned in the heel cavity and comprising multiple layers of an electret film. Embodiment A may have variations such as (i) the multiple layers being formed by folding the electret film; (ii) the multiple layers being formed by rolling the electret film; (iii) an insulating material being placed between layers of the rolled electret film; or (iv) the electret film comprising a deformable, permanently charged, polymer layer with cells formed therein and two conductive layers on first and second sides of the polymer layer. Variation (iv) could also comprise a second multiple layer electret film being positioned in a toe end of the shoe.

Embodiment A may further comprises a rectifier and a power storage device connected to the electret film; or the power storage device may a battery or a capacitor. In such an example, the battery may be designed to operate at a voltage of between about 1 and about 10 volts, i.e., the battery could operate at approximately a single design voltage, i.e., about 3 volts (9 volts, ect.), not that a single battery is intended to operate over the full range of 1 to 10 volts. The Embodiment A may have an electret film less that 500 um thick or the rectifier and the power storage devices may be positioned in the shoe.

Another embodiment (Embodiment B) may be a lower power, DC generation and storage device comprising: a. a power generation section comprising a multiple layers of an electret film; b. a rectifier connected to the electret film; and c. a power storage device connected to the rectifier. Embodiment B may include the multiple layers being formed by folding the electret film or the multiple layers being formed by rolling the electret film. In the latter case, an insulating material may be placed between layers of the rolled electret film.

A further embodiment (Embodiment C) may be a method of generating power through human locomotion comprising the steps of: a. providing a power generation device comprising a multiple layers of an electret film, a rectifier connected to the electret film, and a power storage device connected to the rectifier; and b. positioning the power generation device on a human and/or his equipment such that the multiple layers of electret film are repeatedly compressed during walking. Embodiment C includes the electret film being positioned in at least one shoe of the human or the shoe having a heel cavity in which the electret film is positioned. Likewise, the rectifier and the power storage devices may be positioned in the shoe or Embodiment C may have the multiple layers formed by folding the electret film or by rolling the electret film.

Although the above disclosure has been described in terms of certain specific embodiments, it will be understood that many other obvious modifications and variations may be made to the present invention. All such modifications and variations are intended to fall within the scope of the following claims.

I claim:

1. A power generating shoe comprising:
   a. a power generation section comprising a multiple layers of a electro-mechanical transducer material positioned in or on a shoe body;
   b. a rectifier connected to said electro-mechanical transducer material;
   c. a DC to DC converter connected to said rectifier, said converter comprising:
      i. a voltage input terminal and a voltage output terminal;
      ii. at least a first capacitor element and a second capacitor element, wherein said second capacitor element comprises a plurality of individual capacitors;
      iii. a switch network comprising:
         1) a first phase wherein said plurality of capacitors are in series to said first capacitor element and disconnected from said output terminal; and
         2) a second phase wherein said plurality of capacitors are in parallel with said output terminal and disconnected from said first capacitor element; and
      iv. a switch controller which switches to said second phase when a first voltage is created across said first capacitor element and which switches to said first phase when a second, lower voltage is created across said first capacitor element; and
   d. a power storage device connected to said converter.

2. The power generating shoe according to claim 1, wherein said multiple layers are formed by a folded electret film.

3. The power generating shoe according to claim 1, wherein said multiple layers are formed by rolling an electret film.

4. The power generating shoe according to claim 3, wherein an insulating material is placed between layers of said rolled electret film.

5. The power generating shoe according to claim 1, wherein diodes are positioned between said individual capacitors in said second capacitor element such that said individual capacitors may be switch between said parallel phase and said series phase.

6. The power generating shoe according to claim 1, wherein said switch controller comprises an oscillator which turns on when said first voltage is reached.

7. The power generating shoe according to claim 6, wherein said oscillator oscillates at a frequency between about 100 Hz and about 10000 Hz.

8. The power generating shoe according to claim 7, wherein said frequency is about 500 Hz.

9. The power generating shoe according to claim 1, wherein said plurality of individual capacitors each have approximately equal capacitance.

10. The power generating shoe according to claim 9, wherein said capacitors have a capacitance between about 0.1 uF and about 100 uF.

11. The power generating shoe according to claim 10, wherein said first capacitor element has a capacitance of between about 1 uF and about 1 mF.

12. The power generating shoe according to claim 1, wherein said power storage device is a battery designed to operate at a voltage of between about 1 and about 10 volts.

13. The power generating shoe according to claim 1, wherein said multiple layers comprises a piezoelectric material.

14. A DC to DC converter circuit comprising:
   a. a voltage input terminal and a voltage output terminal;
   b. at least a first capacitor element and a second capacitor element, wherein said second capacitor element comprises a plurality of individual capacitors;
   c. a switch network comprising:
      i. a first phase wherein said plurality of capacitors are in series to said first capacitor element and disconnected from said output terminal; and
      ii. a second phase wherein said plurality of capacitors are in parallel with said output terminal and disconnected from said first capacitor element; and
   d. a switch controller which switches to said second phase when a first voltage is created across said first capacitor element and which switches to said first phase when a second, lower voltage is created across said first capacitor element.

15. The DC to DC converter circuit according to claim 14, wherein said switch controller comprises an oscillator which turns on when said first voltage is reached.

16. The DC to DC converter circuit according to claim 15, wherein said oscillator oscillates at a frequency between about 100 Hz and about 10000 Hz.

17. The DC to DC converter circuit according to claim 14, wherein the voltage input terminal has an input voltage and the voltage output terminal has an output voltage, and the input voltage is greater than the output voltage.

18. The DC to DC converter circuit according to claim 14, wherein the first capacitor is not capable of discharging to the output terminal.

19. The DC to DC converter circuit according to claim 14, wherein only the second capacitor element is capable of discharging to the output terminal.

20. A DC to DC converter circuit comprising:
  a. a voltage input terminal and a voltage output terminal;
  b. at least a first capacitor element and a second capacitor element, wherein said second capacitor element comprises a plurality of individual capacitors;
  c. a switch network comprising:
    i. a first phase wherein said plurality of capacitors are in series to said first capacitor element and disconnected from said output terminal; and
    ii. a second phase wherein said plurality of capacitors are in parallel with said output terminal and disconnected from said first capacitor element; and
  d. a switch controller which switches to said second phase when a first voltage is created across said first capacitor element and which switches to said first phase when a second, lower voltage is created across said first capacitor element; and
  e. wherein diodes are positioned between said individual capacitors in said second capacitor element such that said individual capacitors may be switched between said parallel phase and said series phase.

* * * * *